3,817,811
AUTOCLAVE FOR GLASS LAMINATES

Friedrich Halberschmidt, Merkstein, Karl-Heinz Linberg, Horbach, Paul Roentgen, Bietigheim, and Hans Steffens, Aachen, Germany, assignors to Saint-Gobain Industries, Neuilly-sur-Seine, France
Filed Aug. 20, 1971, Ser. No. 173,413
Claims priority, application France, Aug. 24, 1970, 7030846; Oct. 23, 1970, 7038319
Int. Cl. B32b 31/20
U.S. Cl. 156—382
3 Claims

ABSTRACT OF THE DISCLOSURE

A method of adhesively interconnecting a stack of sheets which can be thermally conjoined at their proximate faces which comprises immersing the stack in a hot liquid bath for a time and at a temperature at which the sheets adhere, removing the conjoined stack from the hot liquid, immersing the stack in a cold liquid bath at rigidifying temperature, and removing the rigid stack from the cold liquid. The objects as to apparatus are accomplished by apparatus for the thermal treatment with pressure of objects which comprises a plurality of tanks, means to heat the tanks to different temperatures, means to put an object into one said tank, means to transfer the object to another said tank, and pneumatic means to impose liquid pressure upon the object within a said tank.

---

This invention relates to a method and to an apparatus for joining objects adhesively by an action involving heat and pressure. An important use of this invention is in the manufacture of safety glass, for instance of the type used in automobile windshields wherein two sheets of glass are conjoined by an interlayer of polyvinyl butyral which is made to adhere to both by heat and pressure. This specific use does not detract from the generality of the invention which is applicable to many objects and operations involving the adhesive interattachment of plies of material. In some cases the materials of the plies are themselves thermoadhesive and in other cases a more satisfactory result is obtained if an adhesive interlayer is employed, the nature of the interlayer depending upon the object and its use.

In the manufacture of safety glass by the adhesive conjoining of sheets of glass or of plastic materials with or without one or more layers of thermoadhesive, the parts of the windshield are assembled in a stack, put into an autoclave and heated to a temperature at which the interlayer becomes softened and adhesive, under sufficient pressure, and is then cooled while maintaining the pressure, in a liquid of lower temperature. In a known process of this type the stack, for instance two layers of glass with an interlayer of thermoadhesive, usually of polyvinyl butyral, is placed in an evacuated autoclave which is then filled with a hot liquid at a temperature which heats the interlayer to adhesive temperature, the pressure in the autoclave being set as desired. Finally the hot liquid is drawn off while the pressure is maintained and a cold liquid is admitted to the autoclave. After cooling the stack, which is now a unified object, the pressure is relieved and the object is withdrawn. German Pat. 587,457 can be referred to.

In that known process the entire autoclave and its contents are first heated then cooled. Furthermore the heating and cooling under pressure is attended by this grave inconvenience, that the cycle of treatment takes a long time.

It is an object of the invention to complete the hot treatment and the cold treatment under pressure of a stack of objects to be adhesively conjoined in a cycle of sharply reduced duration, and to reduce the quantity of heat energy needed to carry out the process. Other objects are to develop a more efficient, more rapidly operable, apparatus by which to adhesively conjoin objects of conforming shape, to improve the control of temperature and pressure in the process and the transportation and handling apparatus. A further object is to develop novel autoclaves with superior speeds of operation and feature of construction.

The objects as to process are accomplished by a method of adhesively interconnecting a stack of sheets which can be thermally conjoined at their proximate faces which comprises immersing the stack in a hot liquid bath for a time and at a temperature at which the sheets adhere, removing the conjoined stack from the hot liquid, immersing the stack in a cold liquid at rigidifying temperature, and removing the rigid stack from the cold liquid. The objects as to apparatus are accomplished by apparatus for the thermal treatment with pressure of objects which comprises a plurality of tanks, means to heat the tanks to different temperatures, means to put an object into one said tank, means to transfer the object to another said tank, and pneumatic means to impose liquid pressure upon the object within a said tank. Other objects are accomplished by the details of construction of the specific forms and structures of the apparatus inventions disclosed in the drawings.

These results are obtained according to the invention by heating the stack to adhesive temperature in a bath of hot, inert liquid, removing it from the hot bath and transferring it promptly to a cloth bath, above which and in which it is subjected to pressure of degree which maintains and improves the adhesion of the layers of the stack while it is being cooled. In one form of the invention the pressure is applied pneumatically to the hot stack just before it is immersed in the cold liquid. In another and preferred form of the invention, pressure is pneumatically applied to the stack before it is admitted to the hot bath, is maintained while it is in the hot bath, is continued during the transfer from the hot to the cold bath, and is continued within the cold bath. In some cases the pressure is applied by raising the pressure inside an autoclave, containing one or more baths, to several atmospheres. In other cases the pressure in the autoclave can be generated by forcing the liquid of one or more baths into an autoclave which is closed and sealed.

The new process and apparatus have the advantages that the temperatures of the liquids chosen for heating and cooling may be maintained with greater precision than in known processes. This has a particular consequence of advantage because the temperature of the cooling liquid has much influence on the quality of the adhesive bond and consequently on the mechanical properties of the product. By this invention the cooling liquid may be maintained constant at precisely the optimum temperature which is chosen.

In a first form of the invention which is illustrated by the apparatus of FIG. 1 the stacks are raised to adhesive temperature outside the autoclave, the application of pressure taking place immediately above the cooling liquid and being applied simultaneously to the stack and the liquid. The submersion is carried out very rapidly in the liquid medium which is under pneumatic pressure. The heat exchange is extremely rapid and requires only a fraction of the time essential to the prior operations, the filling and emptying of the autoclave being eliminated along with the time necessary to achieve the right temperature.

The heating of the stack to adhesive temperature may be carried out in a heating tunnel by radiation or by convection, but a particularly advantageous form of heating consists in raising the temperature of the stack by immersion in a liquid at optimum temperature. A particular advantage of this form resides in the fact that the temperature of adhesion is far better controlled and maintained at the desired level than when heating is by gases or by radiation. With radiation and convection heating the measurement of temperature and the maintenance of good operating temperature is very difficult. On the contrary when heating is by immersion in a liquid, heat exchange is more even, more sure, and more rapid, and is readily maintained constant by simple means. Inasmuch as the heating of the stack, at least in the case of safety glass, takes longer than the treatment in the cooling autoclave of FIG. 1, the heating can be carried out in elongated reservoirs, the stack being transported within the reservoirs either continuously or stepwise until it reaches the autoclave. It is also possible to combine a step of preheating by convection or radiation in a gaseous medium with the immersion in hot liquid. For such cases one may use an ordinary heating tunnel. In that case the treatment in the hot liquid will have as a main object to bring the stack with certainty to the exact temperature of adhesion desired and to maintain it until complete equilibrium of temperature has been attained throughout the stack. After the stack has reached adhesive temperature it takes less than a minute to put it under pressure. Because the treatment under pressure is carried out in a gaseous atmosphere just above the cooling liquid, the cooling phase follows the application of pressure without any lapse of time in transfer, which has the advantage that the cooling liquid is automatically at the same pressure as the gas above the liquid.

In a second and preferred form of the invention the stacks are raised to adhesive temperature inside the same autoclave which contains the cooling bath. The stack is first plunged into a hot bath inside the autoclave and is then transferred to the cold bath while being under the selected pressure throughout the two steps of the operation. In this form of the invention water can be used as the heating liquid whereas in the form of FIG. 1 the heating liquid is any inert liquid which has a boiling point substantially higher than the temperature of adhesion. When water is used with glass sheets and an interlayer of polyvinyl butyral a temperature on the order of 140° C. may be employed. The water may be maintained at a temperature in a reservoir exterior to the autoclave, under the chosen pressure, being pumped into the autoclave after it has been closed and withdrawn into the reservoir before the autoclave is reopened. It will be understood that the temperatures employed will vary according to the temperatures at which the particular adhesive in use becomes adhesive.

The pressure chosen for the atmosphere within the autoclave may be obtained by introducing a gas such as air at the selected pressure or by hydraulically compressing the gas in the autoclave by the injection of one or more of the baths after the autoclave is closed (FIG. 5). It is advantageous before applying the thermal treatment under pressure to enclose the stack in a sealed, evacuated, flexible sack. Such sacks reduce the speed of heat transfer between the stack and the liquid only a little but this has a substantial advantage that it reduces the thermal shock which may create strains in the glass or even rupture it. Finally the envelope seals the edges of the stack which is frequently necessary when substantial pressures are being employed.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIG. 1 is a vertical sectional view through an apparatus which heats the stack outside the autoclave;

Figure 1:
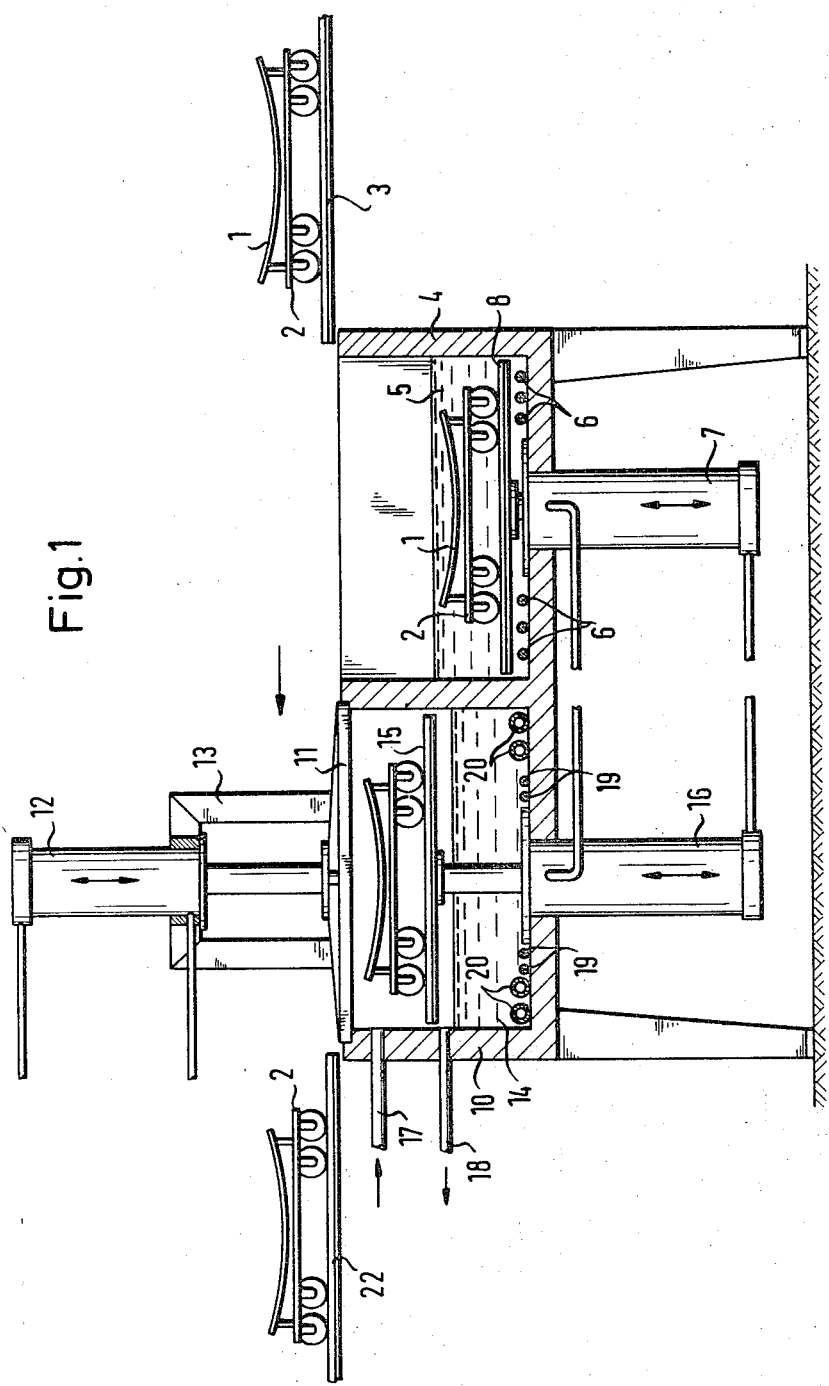

The following constitutes a specific example of the method accompanied by a description of the several forms and modifications of apparatus.

In preparing the stack one takes two elementary sheets, for instance of bent glass shaped for a windshield, interposes a sheet of polyvinyl butyral of the same size and shape, evacuates the stack, encloses it in a flexible plastic sack, for instance polyvinyl chloride which is impermeable to gas, and maintains it under vacuum while it is sealed at the edges of the stack. The stack is thus under the pressure established by the vacuum within the sack and the atmosphere pressure outside of it. In our further description we will consider this to be the stack, which is placed on a truck 2 which rides on rails 3 which extend to the upper edge of the receptacle or tank 4 in which is found the heating liquid 5. The liquid is at a temperature of 140° C. and is maintained as constant as possible by means of the heating elements 6 which are controlled in a known manner by thermostats. Within the tank 4 is a table 8 which may be raised and lowered by a screw 7. The truck 2 is run onto the plate 8 when the latter is in its upper position. The screw 7 is then immediately operated to lower the plate, the truck, and the stack 1 until they are submerged in the hot liquid 5. Beside the tank 4 and at its same level is autoclave 10 which is closed above by cover 11 which may be raised and lowered by screw 12 which is mounted on a support 13 outside the autoclave. Inside the autoclave is cooling liquid 14 at a temperature of 60° C., for instance. Within the autoclave is a plate 15 which can be raised and lowered by screw 16. The autoclave is also in communication with conduit 17 through which gas under pressure can be injected and with a conduit 18 through which the gas can be withdrawn, both conduits being controlled by means not shown to establish a chosen pressure. Autoclave 10 also contains heating elements 19 and cooling elements 20 by means of which the temperature of the cooling liquid can be kept at its chosen value.

As soon as the stack in tank 4 has reached adhesive temperature the cover 11 of the autoclave is raised, the plate 15 is brought to its upper position, the plate 8 is raised to its upper position on a level with plate 15, and the truck 2 is rolled from plate 8 onto plate 15. In general the track 3 may be considered to be sectional, sections being mounted on the plates 8 and 15. The plate 15 is lowered into the autoclave sufficiently to allow the cover to be closed yet not deeply enough to submerge the stack. After the cover has been closed the conduit 17 is opened and air under pressure is admitted, for example to 12 atmospheres. When the pressure has attained the value of 12 atmospheres, the stack is kept for about 60 seconds in the gas under pressure then lowered until it is wholly submerged in the cooling liquid, the pressure being maintained until the stack has reached 60° C. At this moment the pressure in the autoclave is relieved through conduit 18, the cover is opened, and the plate 15 returns to its upper position. The truck is then pushed onto the rails 22 and taken elsewhere to discharge the stack.

In FIGS. 2–5 are different forms of apparatus in which the autoclave encloses two different fluids, one for heating and the other for cooling.

Figure 2:
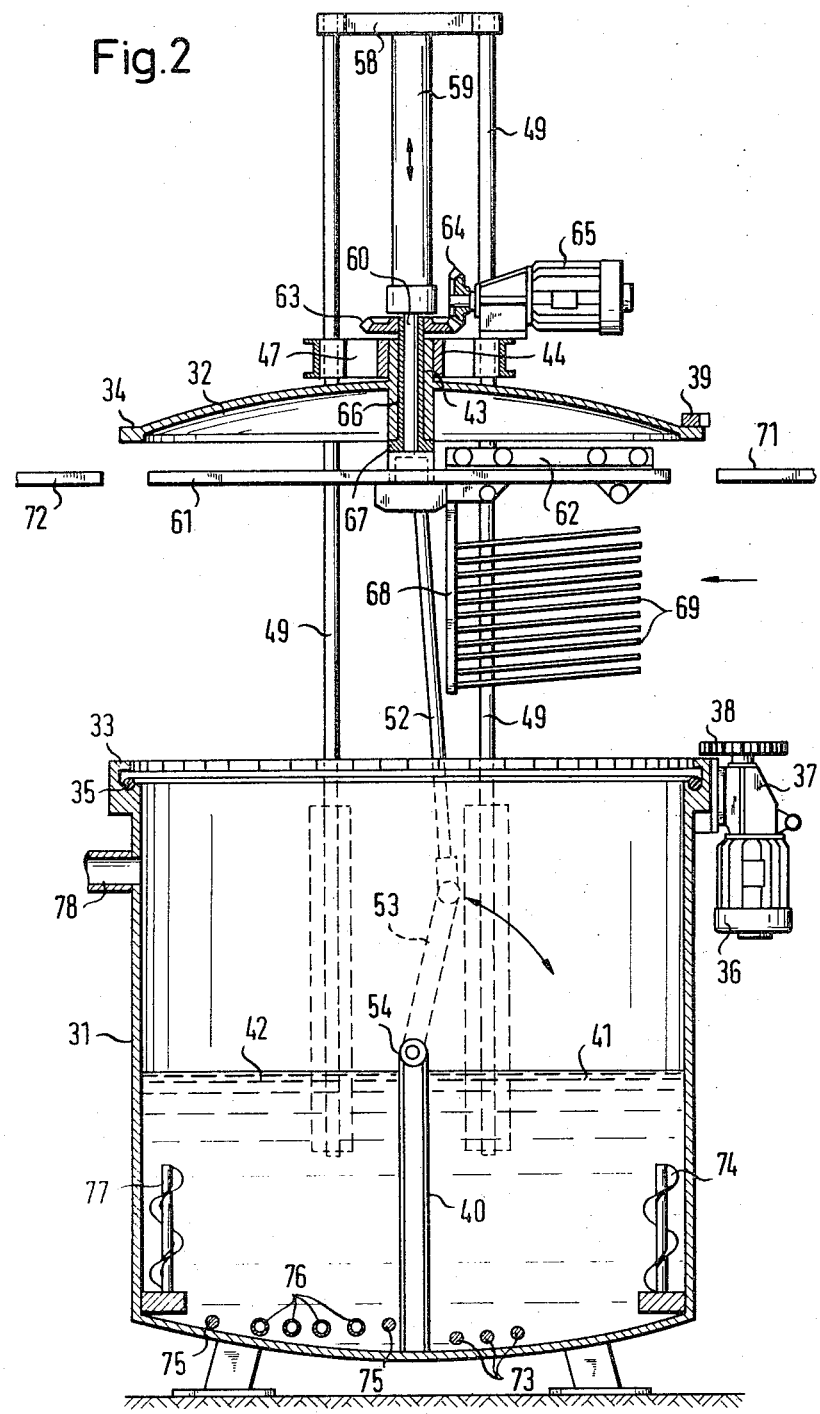
FIG. 2 is a vertical sectional view through a novel autoclave of superior design which is adapted to carry out the second and preferred form of the invention.
Figure 3:
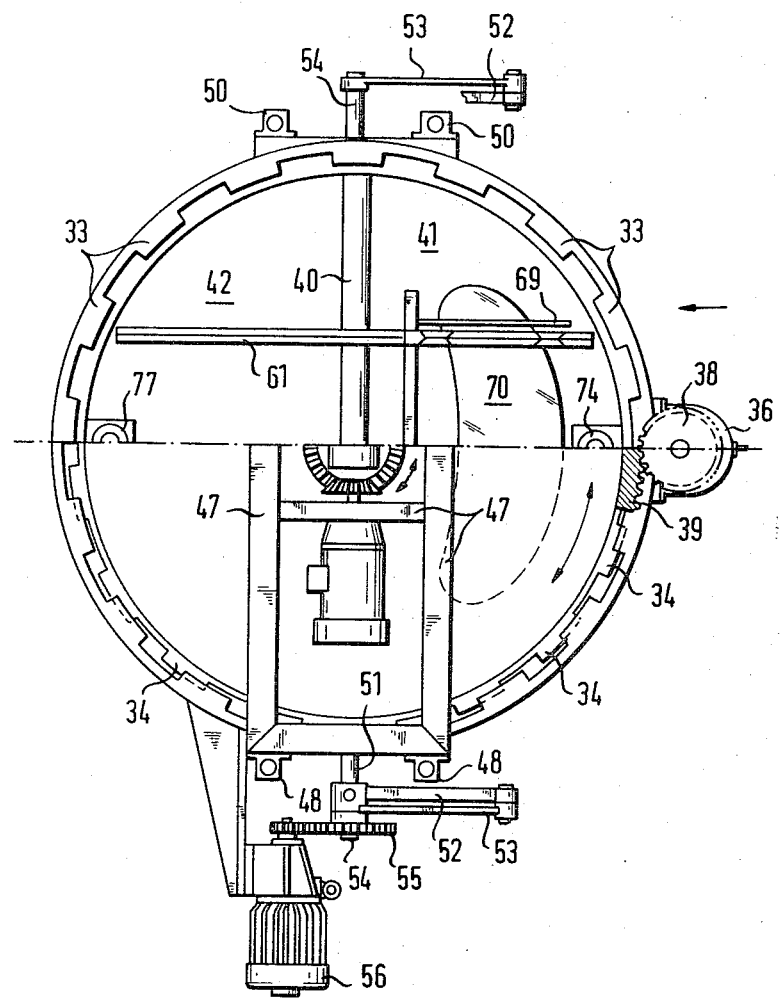
FIG. 3 is a plan view of the autoclave of FIG. 2 cut away at different levels to show various features of construction.

In FIGS. 2 and 3 autoclave 31 has the form of a vertical cylinder closed above by cover 32. In order to obtain a tight closure there is provided along the upper edge of the cylinder a series of equally spaced projections 33 which are matched by oppositely disposed projections 34 on the cover. These projections have oblique cams when tangentially viewed. By a slight rotation of cover 32 the cover is pressed aginst the gasket 35 which encircles the top rim of the cylinder, forming a tight joint. The rotation of cover 32 is produced by motor 36, gear train 37 and pinion 38 which drives a crown gear 39 fixed to the cover.

The autoclave 31 is interiorly provided with a transverse wall 40 which divides its lower half into two chambers 41, 42 of equal capacity of which chamber 41 contains the heating liquid while 42 contains the cooling liquid.

The cover 32 has a centrally located cylindrical bearing 43 which is mounted in a sleeve bearing 44 fixed in a frame 47 of angle irons. The frame 47 carries on its front face sleeves 48 by means of which the frame 47 is attached to a group of shafts 49. The lower parts of shafts 49 are mounted for sliding movement in sleeves 50 which are attached to the outside of the autoclave. On the front of the frame 47 are the ends of shafts 51 engaged with cranks 52 which are in turn moved by cranks 53. Cranks 53 are keyed to the ends of the shaft 54 which passes horizontally through the autoclave and is located at the upper part of the median wall 40. Motor 56 drives the cranks 52, 53 upward or downward through the motion of shaft 54 and the gear 55, the cover 32 participating in these upward and downward movements. At the upper part of shafts 49 is a transverse frame 58 carrying a screw 59. The shaft 60 of the screw passes slidably through the cylindrical bearing 43. At the lower part of the screw shaft 60 are fixed rails 61. Under the action of screw 59 these rails may thus be raised or lowered with the truck 62 which supports the stacks whatever may be the position of the cover. The rails 61 are mounted for rotation with the sleeve 66 which is obtained through conical pinion gear 63 which is rotated by motor 65 through a conical pinion gear 64. The coupling of the conical pinion 63 to the rail 61 is accomplished by the lower teeth 67 of the bearing 66 at the upper part of which the conical pinion 63 is attached. Rotation of rail 61, circularly within the autoclave, is thus possible only when in gear, that is to say in the upper position of rail 61 with respect to cover 32. The truck 62 may roll along the rail 61. Supports 68 which receive the stacks are attached to this truck. Supporting arms 69 are fixed in a position slightly tilted from horizontal on supports 68 and receive the stacks 70. To fill the autoclave the mobile assembly 62, 68, 69 is pushed from rail 71 onto rail 61 to begin the treatment and afterwards is pushed from rail 61 onto rail 72. Inside the chamber 41 are heating elements 73 and the thermostatic control which, by controlling them, keeps the liquid at constant temperature, which in the case under discussion is about 140° C. The agitators 74 produce an intensive mixing of the liquid and achieve a uniform distribution of temperature and a good and quick heat exchange with the glass.

Chamber 42 contains heating elements 75 and also cooling elements 76 both of which are controlled by a thermostat in the same chamber so as to maintain the cooling liquid at constant temperature, in this case about 60° C. Intensive agitators 77 are also provided in this chamber to achieve uniformity of temperature.

The operation of the apparatus is as follows:

When the cover 32 is raised to its upper position the mobile assembly 62, 68, 69 carrying the stacks 70 is pushed from rail 71 onto rail 61. We will assume that the mobile assembly has first passed through a heating tunnel in which the stacks have been preheated to a temperature somewhat below 140° C. As soon as the mobile assembly is in the position shown in FIG. 2 the cover is lowered, as well as the guide shafts 49, under the drive of motor 56. The motor 36 is then rotated a little to seal the tight joint and the mobile unit 62, 68, 69 is lowered by screw 59 into the liquid of chamber 41, submerging the stacks in the liquid for the short time which is necessary for all the stacks to attain the temperature of the liquid and for the adhesive to become active. Simultaneously air under pressure is introduced through 78 until a pressure of perhaps 10 atmospheres is attained. When all the sheets of glass are at even temperature the rails 61 and consequently the novel assembly are raised by screw 59 and motor 65 and the rails rotate 180° within the autoclave. The screw 59 is then operated again which lowers the mobile unit and immerses the stacks in the cold liquid of tank 42. The pressure within the autoclave is maintained during this operation and is not relieved until the sheets of glass have been cooled to a temperature of about 60° C. After the relief of the pressure the cover of the autoclave is turned to release the seal and raises to its upper position with rail 61 aligned with rail 72. The truck is rolled off and to other operations.

Figure 4:
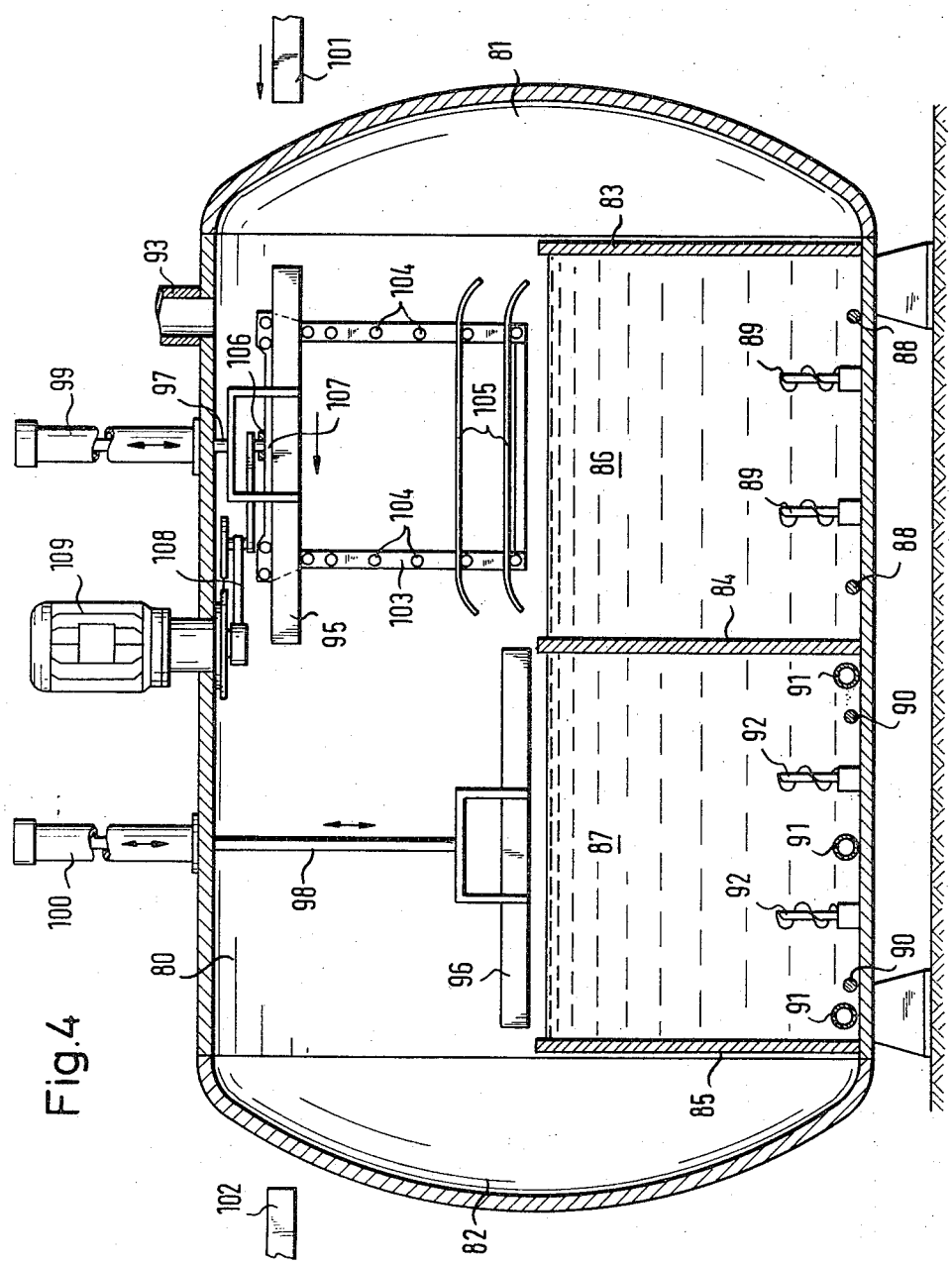
FIG. 4 is a second modification of the preferred form of the apparatus in vertical section.

FIG. 4 shows a second form of the invention with its essential operating elements. The autoclave 80 is horizontal and is located in a production line of which rails 101, 102 are indicated. The ends of the autoclave are closed by covers 81 and 82 which are sealed in any approved manner, such as that of FIGS. 2 and 3. In the lower half of the autoclave are transverse walls 83, 84, 85 which form two tanks 86 and 87 which hold the liquid baths, the heating elements 88–90 and the cooling tubes 91. These elements are thermostatically controlled to maintain the selected temperatures and uniformity of temperature in each tank is facilitated by stirrers 89–92. The pipe 93 introduces air under pressure.

Above the tanks are rails 95–96 which are supported on piston rods 97–98 which are attached to pistons in cylinders 99–100 which can be raised or lowered at will by the usual controls; in upper position these rails are aligned with rails 101–102 as vertically movable sections of a sectional track. The rails 101–102 are extensible so as to be projected into the autoclave to provide for the transportion of truck 107 from which depends the frame 103–104 which furnishes a support for the stacks 105. Supports 103 are provided at their upper part with a coupling member 106 which is pivotally linked to an articulated arm 108 which is rotatable by motor 109. Starting the motor will move the truck along the rails 95 and onto rails 96 when they are aligned.

This apparatus operates as follows: To charge the autoclave the cover 81 is opened, rail 101 is pushed into contact with rail 95 and support rack 103 is transferred to rail 95. The autoclave cover is replaced and sealed, the piston 99 lowers rail 95, rack 103 enters the hot liquid in the tank, and gas under pressure enters through pipe 93. When the stacks on the rack have about reached the temperature of the liquid the rail 95 and the rack are raised and the linkage 108 moves them onto rail 96, which is lowered by piston 100 until the stacks are immersed in the cold liquid of tank 87. When the stacks have been sufficiently cooled, e.g. to the temperature of the bath, the rail 96 is raised to its upper position, the pressure in the autoclave is reduced, the cover 82 is opened, rail 102 is moved into contact with rail 96 and the truck is rolled off to another station.

In the forms of the invention herein disclosed the pneumatic pressure upon the stack can be applied before immersion in the first bath, before immersion in the second bath, or after immersion in the first bath. In most cases pneumatic pressure is maintained between the baths. This facility of manipulation is of material value when viewed in the light of the many types of materials to which the process and apparatus are applicable. In FIGS. 2 to 4 the autoclaves use fluids of boiling point above the temperature of adhesion, above 140° C. in the case of glass sheets with an interliner of polyvinyl butyral, under the conditions of pressure imposed, in this specific case up to about 12 atmospheres of pressure.

Figure 5:
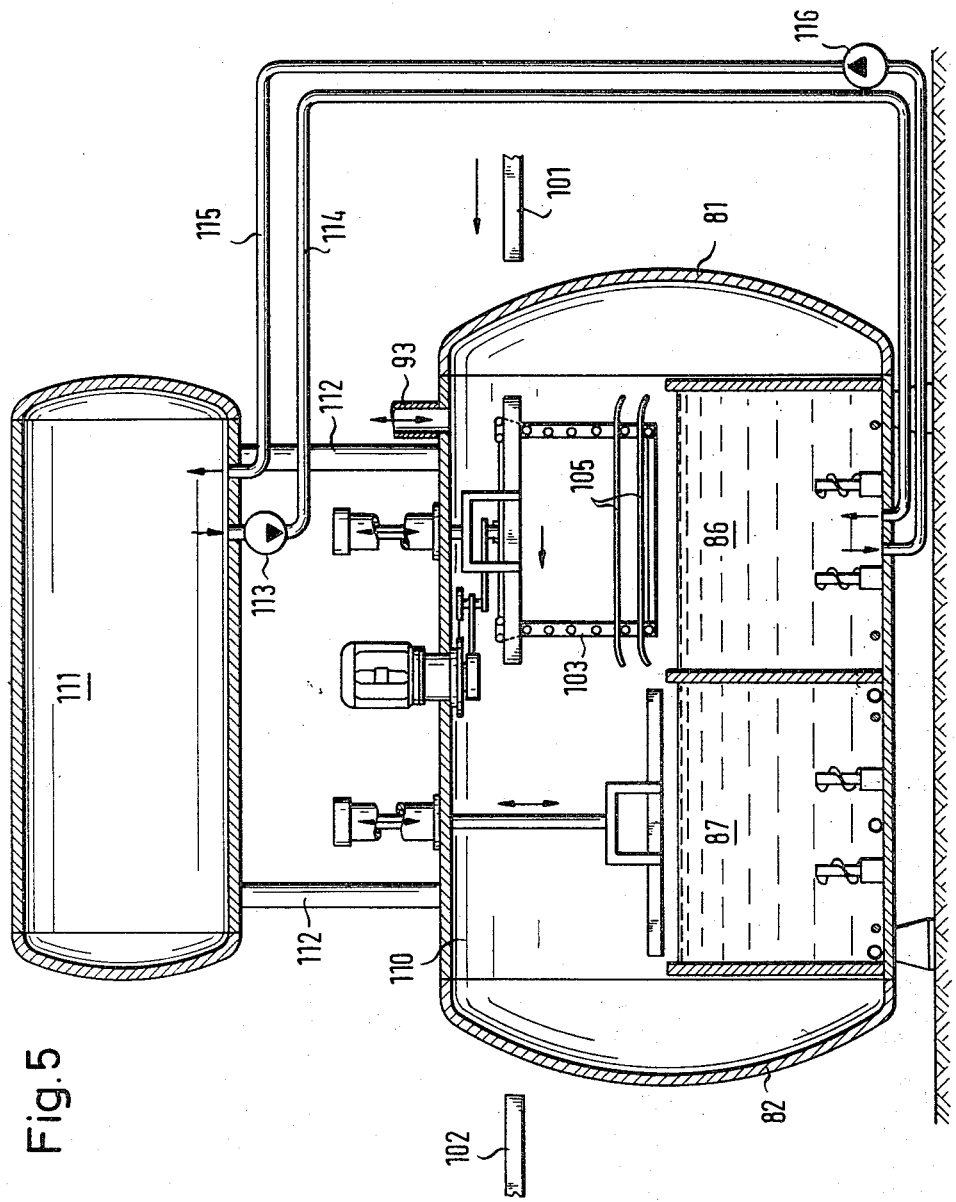
FIG. 5 is a vertical sectional view through yet another modification of the preferred form.

In the case of the apparatus of FIG. 5 the fluid used may be water or other liquid which boils at atmospheric pressure but remains liquid under the pressure of the operation. The temperature needed being at 140° C. for the windshield operation the water is kept in a reservoir at 140° C. outside the autoclave while the autoclave is being loaded and emptied. The reservoir 111 under pressure needed to maintain liquidity (see steam tables) rests on supports 112 mounted on the autoclave and is equipped with appropriate heating means not shown. As soon as the autoclave is charged and sealed the water from the reservoir is injected into tank 86 by pump 113 through conduit 114. This injection compresses the air in the autoclave which now includes water vapor in equilibrium and this pressure can be increased through pipe 93. The pumping system is of large capacity to provide rapidity of filling and emptying of the tank. As soon as the tank is filled with the hot water the operation proceeds as in FIGS. 2–4. As soon as the stacks have passed through tanks 86 and 87 the hydraulic pressure in the autoclave established by the liquid of reservoir 111, assisted by pneumatic pressure from pipe 93 if desired, is reduced to atmospheric, the autoclave may be opened, discharged and recharged and the operation repeated.

The sealed sack which encloses the evacuated sheets and protects them during processing is preferably polyethylene and the liquid employed is preferably castor oil. This is a combination of superior efficiency, particularly in that the castor oil does not degrade the polyethylene at the elevated temperatures in use. Water may be used but it is more interesting for use in the apparatus of FIG. 5 than elsewhere, and in the other figures if used would be employed in the cold tank.

EXAMPLE 1

A safety glass windshield was made by a process similar to that of FIG. 2. The lower part of the autoclave was half filled with castor oil, the first tank at 140° C. and the second at 65° C. The stack included two glass sheets with an interliner of polyvinyl butyral held together immovably by suitable adhesive tapes and enclosed and sealed within a polyethylene sack under vacuum. The sack and contents were preheated to 140° C. by passage through a tunnel furnace and placed in the first bath of castor oil in the autoclave which was at 140° C. The autoclave was closed and raised to 12 atmospheres for 5 minutes. The cooling bath in the autoclave was kept at 65° C. The sack was transferred to it for about 1 minute after which the autoclave was opened and the sack removed. Examination showed no imperfections in the product such as bubbles or the like and excellent transparency illustrating perfect adhesion.

EXAMPLE 2

In this example the sack was omitted, the stack was preheated to 140° C. as in Example 1 in castor oil and transferred to an autoclave containing water at 65° C. The autoclave was closed and pressurized to 10 atmospheres before the stack was immersed in the cooling water. The product was of excellent quality.

As many apparently widely different embodiments of the present invention may be made without departing from the spirit and scope thereof, it is to be understood that the invention is not limited to the specific embodiments.

What is claimed is:

1. An autoclave for the treatment of laminated safety glass comprising means defining a closable chamber, means defining within the chamber a plurality of open vessels capable of containing distinct liquids beneath a common vapor space within the chamber, means to introduce assemblies of laminated glass into the chamber, and means to advance the assemblies for residence successively in a first of said vessels, in said vapor space, and in a second of said vessels before removal from said chamber.

2. An autoclave according to claim 1 including separate temperature controlling means in each of said vessels.

3. An autoclave according to claim 1 including liquid circulating means in each of said vessels.

References Cited

UNITED STATES PATENTS

| 1,965,113 | 7/1934 | Drake | 156—283 |
| 2,317,276 | 4/1943 | Knight | 156—382 |
| 1,808,381 | 6/1931 | Sherts | 156—382 |
| 1,987,306 | 1/1935 | Murphy | 156—382 |
| 2,965,527 | 1/1960 | Morris | 156—105 |
| 1,819,336 | 8/1931 | Penning | 156—382 |
| 1,965,114 | 7/1934 | Drake | 156—382 |

DANIEL J. FRITSCH, Primary Examiner

U.S. Cl. X.R.

156—105, 498

UNITED STATES PATENT OFFICE
CERTIFICATE OF CORRECTION

Patent No. 3,817,811          Dated June 18, 1974

Inventor(s)  Friedrich Halberschmidt et al.

It is certified that error appears in the above-identified patent and that said Letters Patent are hereby corrected as shown below:

Column 2, line 30, for "cloth" substitute --cold--.
Column 4, line 21, for "atmosphere" substitute --atmospheric--.

line 4, for "aginst" substitute --against--.
Column 8, line 30, for "1" substitute --2--.

Signed and sealed this 3rd day of December 1974.

(SEAL)
Attest:

McCOY M. GIBSON JR.
Attesting Officer

C. MARSHALL DANN
Commissioner of Patents